P. A. KOEHRING.
CONCRETE DISTRIBUTER.
APPLICATION FILED JULY 12, 1913
Reissued Sept. 16, 1913.
13,617.
3 SHEETS—SHEET 1.
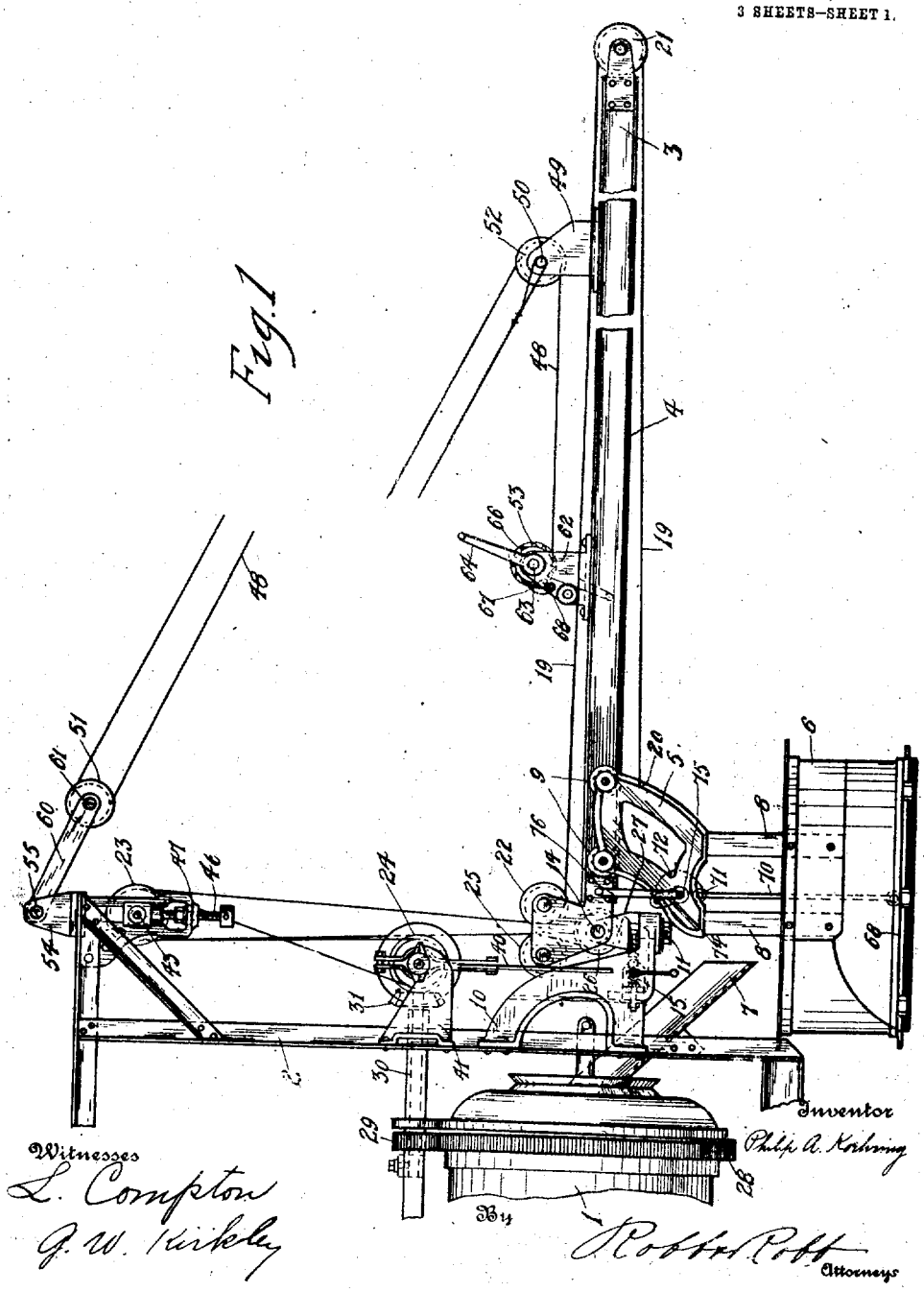
Witnesses
L. Compton
J. W. Kirkley
Inventor
Philip A. Koehring
By
Robert Robb
Attorneys

P. A. KOEHRING.

CONCRETE DISTRIBUTER.

APPLICATION FILED JULY 12, 1913.

Reissued Sept. 16, 1913.

13,617.

3 SHEETS—SHEET 2.

Witnesses

L. Compton

G. W. Kirkley

Inventor

Philip A. Koehring

By Robert Robb

Attorneys

P. A. KOEHRING.

CONCRETE DISTRIBUTER.

APPLICATION FILED JULY 12, 1913.

Reissued Sept. 16, 1913.

13,617

3 SHEETS—SHEET 3

Witnesses

L. Compton

G. W. Kirkley

Inventor

Philip A. Koehring

By Robbins Robb

Attorneys

UNITED STATES PATENT OFFICE.

PHILIP A. KOEHRING, OF MILWAUKEE, WISCONSIN, ASSIGNOR TO KOEHRING MACHINE COMPANY, OF MILWAUKEE, WISCONSIN.

CONCRETE-DISTRIBUTER.

Specification of Reissued Letters Patent. Reissued Sept. 16, 1913.

13,617.

Original No. 1,063,268, dated June 3, 1913, Serial No. 516,451. Application for reissue filed July 12, 1913. Serial No. 778,799.

*To all whom it may concern:*

Be it known that I, PHILIP A. KOEHRING, a citizen of the United States, residing at Milwaukee, county of Milwaukee, and State of Wisconsin, have invented new and useful Improvements in Concrete-Distributers, of which the following is a specification.

Figure 3:
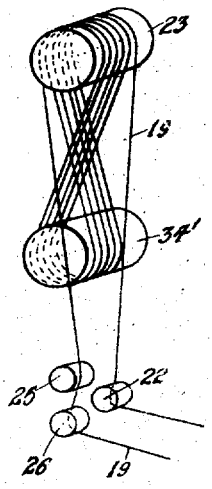
Figure 2:
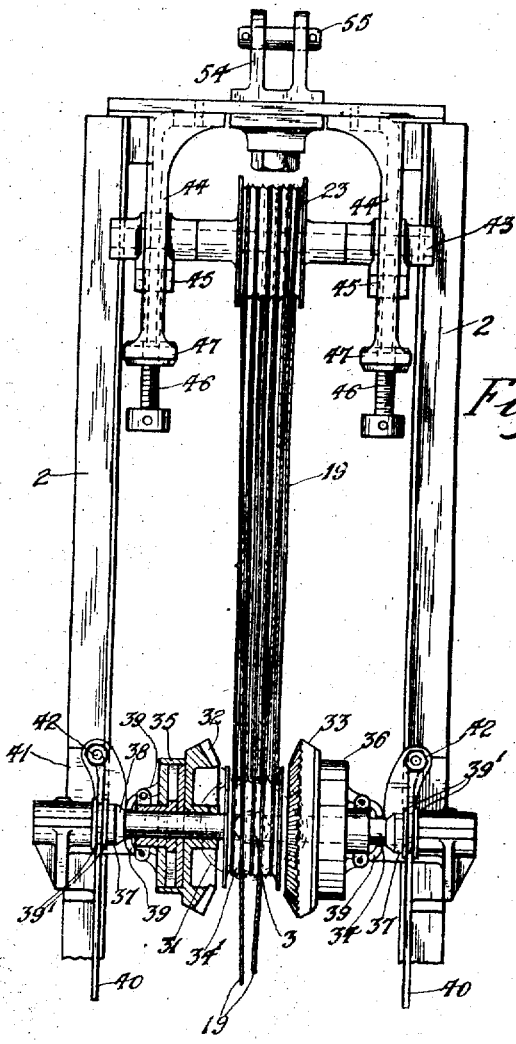
Figure 4:
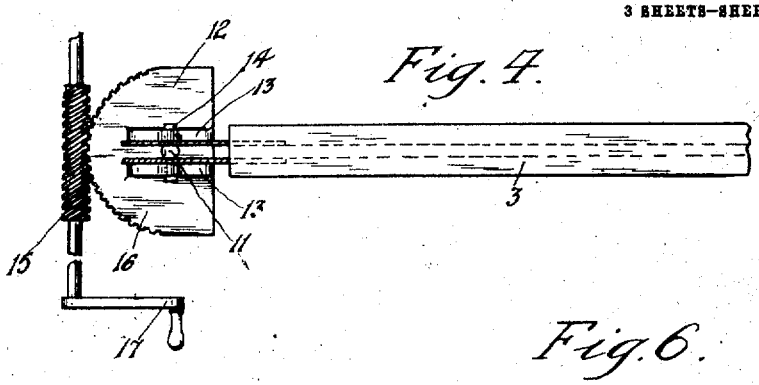
Figure 6:
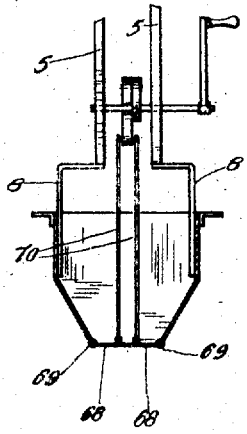
Figure 5:
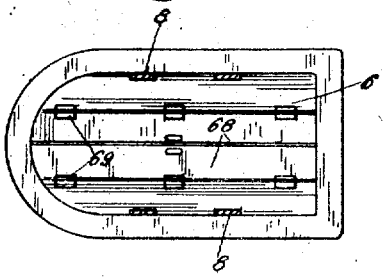
Figure 7:
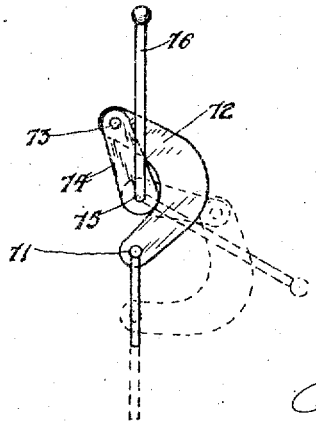

The object of my invention is, more especially among other things, to provide a device to be used in laying walks and street pavements in connection with a concrete mixer for receiving the mixed concrete as it is discharged from the mixing drum and conveying it to the place of deposit in the walk or pavement which is being laid, and the same is explained by reference to the accompanying drawings, in which, Figure 1 represents a side view thereof in connection with the supporting frame of an ordinary concrete mixing machine. Fig. 2 is a detail showing an end view of the cable operating mechanism by which the conveyer of concrete is operated. Fig. 3 is a diagrammatic view in perspective of the cable supporting rollers and pulleys which are employed in moving the conveyer. Fig. 4 is a detail plan of the turn table and operating mechanism. Fig. 5 is a top view and Fig. 6 a vertical section of the concrete receptacle. Fig. 7 is a side view of the discharge controlling operating device.

Like parts are identified by the same reference numerals throughout the several views.

1 is an ordinary concrete mixing drum, and 2 represents a portion of the end frame from which the drum is supported in connection with my concrete conveyer.

3 is a swinging jib or boom which is provided upon its side with a track 4 upon which the carriage 5 is supported and operated, said jib and its supporting parts including the frame 2 constituting a crane of special design.

6 is a receptacle into which the concrete is discharged from the drum 1 through the stationary trough 7. The receptacle 6 is connected with the inwardly canted or inclined carriage 5 through the vertical hangers 8, and the carriage 5 is provided with a plurality of rollers 9 adapted to operate on the track 4 as the receptacle 6 is moved forwardly and backwardly along the boom 3 from the mixing drum to the place of deposit. This operation is permitted because the form of the carriage 5 is such that the receptacle 6 may readily be moved to the position below the axis of the boom 3 and the delivery end of the trough 7. The boom 3 is supported from the vertical frame 2 through the bracket 10, trunnion 11, turn table 12, vertical lugs 13 and pivotal bolt 14. The trunnion 11 is supported at its lower end from the bracket 10, while its upper end is centrally connected with the turn table 12 with which trunnion the turn table performs a partial revolution as the boom is swung to the right and left. The receptacle 6 which is adapted to be moved longitudinally on said track 4 may be brought to any desired point of deposit within the radius described by said swinging boom.

15 is a worm shaft which is revolubly supported in suitable journal bearings on said bracket 10 and is adapted to engage in the teeth 16 formed in the edge of the turn table 12, whereby as the shaft 15 is turned forwardly or backwardly, the turn table 12 and the boom 3 supported therefrom are caused to describe a partial revolution to the right or left.

17 is an operating crank, which is rigidly connected with the worm shaft 15 by which the same is manually operated. While the worm shaft 15 may be manually operated with a crank, a belt or pulley, or equivalent mechanism may be substituted therefor.

19 is a cable by which the carriage 5 and receptacle 6 supported therefrom are drawn forwardly and backwardly upon the boom. One end of said cable 19 is connected with the carriage 5 at the point 20, and it extends from thence around the outer end of the boom and passes over and upon the pulley 21 from thence around the pulley 22, from thence over the drum 23 and from thence backwardly and forwardly between the drum 23 and drum 24 around which drums it passes a plurality of times whereby the required friction is produced between said cables and the drum 24 to prevent it from slipping, when the cable passes from the pulley 23 partially around the pulley 25, from thence around the pulley 26 and from thence to the other side of the carriage 5 with which it is connected at the point 27. The pulleys 22, 25 and 26 have journal bearings in plates secured to the boom 3 at its rear end.

The drum 23 has journal bearings in the hangers 44, which hangers are suspended from the upper end of the frame 2, while the drum 24 has journal bearings in the bracket 41, and said bracket is supported from said frame 2. Thus it is obvious that as said cable is moved in one direction by revolving the drum 24, the carriage 5, together with the receptacle 6 will be moved to the outer end of the boom 3, when by a reversed movement of the drum 24, the cable 19 will be moved in the opposite direction, whereby the receptacle 6 will be drawn back from the outer end of the boom to the point shown in Fig. 1, beneath the discharge end of the trough 7. From the foregoing it will be understood that by the swinging movement of the boom and the horizontal movement of the carriage along such boom the receptacle 6 may be conveyed to and its contents discharged at any point within the radius described by the boom.

Motion is communicated from the mixing drum 1 to the cable 19 either forwardly or backwardly through the gear wheel 28, pinion 29, shaft 30, pinion 31 and reversely revoluble gears 32 and 33 and the drum supporting shaft 34. The gears 32 and 33 are adapted to revolve freely upon their supporting shaft 34, and motion is communicated from either one of said gears 32—33 to the drum 24 at the will of the operator through the clutch mechanisms 35 and 36. The clutch mechanisms 35 and 36 are respectively connected with the supporting shaft 34 and adapted to revolve therewith. When, however, the clutch mechanism is brought into engagement with either one of said gears 32—33, motion is communicated from said gears through said clutch mechanism to said shaft 34, and from said shaft to the drum 34′, whereby said drum is revolved. When the clutch mechanism 36 upon the right is clamped to the gear wheel 33, the drum 34′ is revolved in one direction. When, however, the clutch mechanism 35 upon the left is brought into engagement with the gear 32, the drum 34′ is revolved in the opposite direction. When, however, both clutches are thrown out of engagement with said gears, the drum is permitted to stand at rest. Thus it will be obvious, that while the driving shaft 30 and gears 32 and 33 are continuously revolved in the same direction, the drum 34′ and the cable operated thereby, may be at the will of the operator, be moved in either direction or permitted to stand at rest.

37 and 37 are slidable collars supported upon the shaft 34, and said collars are provided with outwardly diverging bearings 38—38, which are adapted to contact with the arms 39—39 of the clutch mechanism as said collars are moved inwardly, whereby said clutch mechanism is operated and caused to impinge against the bearings of said gears 32 and 33. The collars 37 are respectively provided with radial flanges 39′—39′ formed for the reception of the operating levers 40. The operating levers 40 are pivotally connected to the bracket 41 by the bolts 42, while the free ends of the levers serve as handles for operating said clutch mechanisms.

To produce the required tension and friction of the operating cable 19, the upper drum 23 is adjustably supported from the upper end of the frame 21 through the shaft 43, vertical hangers 44—44, movable journal bearings 45 and adjustable screws 46, which adjustable screws 46 have threaded bearings in the lower ends 47 of said hangers 44, whereby by turning said screws 44 upwardly and downwardly the tension of the cable 19 may be increased or diminished at pleasure.

The outer end of the boom 3 is supported at any desired angle or elevation above its pivotal support 14 by the cable 48, one end of said cable being connected with the outer end of the boom through the bracket 49 and bolt 50, when it passes from thence over the pulley 51 and from thence over the pulley 52, and from thence to the drum 53. The pulley 51 is connected with the top of the frame 2 through the bracket 54, pivotal bolt 55, link 60 and pivotal bolt 61, while the pulley 52 is connected with the outer end of the boom through said bracket 49 and bolt 50, the drum 53 being centrally supported from and connected with the boom 3 through the bracket 62 and drum supporting bolt 63. 64 is a crank by which the drum 53 is revolved. 66 is a ratchet wheel connected at one end to said drum, and 67 is a pawl operating on said ratchet wheel and serves to hold the drum at any desired point of adjustment. The pawl 67 is pivotally supported at its lower end from the boom 3 upon the bolt 68, and its upper end is adapted to engage the teeth of said ratchet. Thus it will be understood that when desirous to raise the outer end of the boom the crank 64 is revolved from left to right, whereby the cable 48 will be wound upon the drum 53 until the boom is brought to the desired point of adjustment, when it will be retained at such point by the drum retaining pawl 67. By the reversed movement of the crank 64, the cable 48 is slackened and the boom 3 is lowered.

For convenience in discharging the contents of the receptacle 6, the bottom of said receptacle 6 is formed in two parts 68—68, which are pivotally connected with the sides of the receptacle by the bolts 69—69, and the opposing edges of said bottom members are supported in their closed position from the carriage 5 through the rods 70, bolt 71, link 72, bolt 73, crank arm 74 and shaft 75.

76 is a crank by which the shaft 75 is turned in its bearings. When the crank 76 is in the position shown in Fig. 1, the bottom members 68—68 are retained in their closed position. When, however, the crank 76 is turned toward the right, the crank arm 73 is carried past the vertical above the shaft 75, when it is permitted to turn beneath said shaft, whereby the bottom members 68—68 are moved from their closed to their open position, when the contents of the receptacle 6 is permitted to flow therefrom to the place of deposit.

Having thus described my invention, I claim:

1. In a device of the described class, the combination of a vertical frame, a boom pivotally supported near one end from said frame, manually actuated means for revolving said boom a partial revolution about its pivotal support, a track carried by the boom, a carriage mounted upon said track, a cable operating along said boom and connected with the carriage, a receptacle suspended from said carriage, means for communicating a forward and backward movement to said carriage, and means carried by the boom for raising and lowering the same.

2. In a device of the described class, the combination of a vertical frame, a plurality of drums connected with the frame, a cable passing about said drums, means for raising and lowering one of the drums, supported from the upper end of said frame, and thereby regulating the tension of the cable, a boom pivotally supported at one end from said vertical frame, manually actuated means for revolving said boom a partial revolution around its pivotal support, a track carried by said boom, a carriage mounted on said track, the aforesaid cable being connected with the boom and with the carriage, a receptacle suspended from the carriage, a drum mounted on the boom, a pulley connected with the upper end of the vertical frame, a cable connecting said last mentioned drum and pulley, and a crank for revolving said drum whereby as said drum is revolved in opposite directions, said boom is adapted to be raised and lowered, all substantially as and for the purpose specified.

3. In a device of the described class, the combination of a vertical frame, a boom pivotally supported near one end from said frame, means for revolving said boom a partial revolution about its pivotal support, a track carried by the boom, a carriage mounted upon said track, a cable extending along said boom and connected with the carriage, a receptacle suspended from said carriage, means for operating the cable and thereby communicating a forward and backward movement to said carriage, and means on the boom for causing raising and lowering movement thereof.

4. In a device of the described class, the combination of a vertical frame, a boom pivotally supported at one end from said frame, means for revolving said boom a partial revolution about its pivotal axis, a track carried by said boom, a carriage mounted on said track, and inclining downwardly and inwardly toward the axis of the boom to permit a receptacle supported by said carriage to move beneath said axis, a receptacle suspended from the carriage, means for communicating a forward and backward movement to said carriage, and means for raising and lowering the boom.

5. In a device of the described class, the combination of a vertical frame, a boom pivotally supported at one end from said frame, means for revolving said boom a partial revolution around its pivotal axis, a track carried by the boom, a carriage mounted upon said track, a cable extending along the boom, drums on the upper and lower portions of said frame about which said cable passes, a receptacle suspended from said carriage, and connected with said cable, means for operating the cable and thereby communicating a forward and backward movement to said carriage, comprising a driving member, clutch mechanisms operable to connect one of the drums with the driving member for reversely operating the said drum and said cable, and controlling means for the clutch mechanisms arranged proximate to the means for revolving the boom.

6. In a device of the described class, the combination of a vertical frame, a bracket projecting from the lower portion of the frame, a swinging boom connected at one end with said bracket, means on the bracket adjacent to the inner end of the boom for revolving the latter a partial revolution about its axis, drums carried by the upper and lower portions of the frame, a carriage mounted to move lengthwise of the boom, a cable passing about said drums and connected at its opposite ends with the carriage, pulleys at the inner and outer ends of the boom in engagement with which said cable operates, a receptacle supported by the carriage, means for reversibly operating said cable to impart a forward and backward movement to said carriage and comprising a driving member, clutch mechanism intermediate said driving member and one of the drums aforesaid, manipulative means controlling the action of said clutch mechanism to connect the last-mentioned drum with the driving member whereby to operate the drum in either of opposite directions, and means operatively connected with the outer end of the boom for raising and lowering the same.

This specification signed and witnessed this 30th day of June, 1913, at Milwaukee, Wis.

PHILIP A. KOEHRING.

Witnesses:
G. H. MILLER,
E. F. HOLLENSTEINER.